United States Patent
Reusmann et al.

(10) Patent No.: US 6,403,701 B1
(45) Date of Patent: Jun. 11, 2002

(54) MIXING SYSTEM FOR PRODUCING WATER-DILUTABLE COATING AGENTS

(75) Inventors: Gerhard Reusmann, Münster; Bernhard Lettmann, Drensteinfurt; Egon Wegner, Münster, all of (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/402,763

(22) PCT Filed: Apr. 6, 1998

(86) PCT No.: PCT/EP98/01984

§ 371 (c)(1), (2), (4) Date: Nov. 11, 1999

(87) PCT Pub. No.: WO98/45381

PCT Pub. Date: Oct. 15, 1998

(30) Foreign Application Priority Data

Apr. 9, 1997 (DE) .......................................... 197 14 577

(51) Int. Cl.[7] .............................. C08J 3/00; C08K 3/20; C08L 75/00; B05D 3/02; C08F 8/30

(52) U.S. Cl. ................. 524/589; 427/372.2; 427/385.5; 524/502; 524/507; 524/522; 524/523; 524/533; 524/558; 524/560; 524/589; 524/590; 524/591; 524/839; 524/840; 525/123; 525/127; 525/131; 525/455

(58) Field of Search ................................. 524/507, 502, 524/533, 522, 523, 558, 560, 589, 590, 591, 839, 840; 525/123, 127, 131, 455; 427/372.2, 385.5

(56) References Cited

U.S. PATENT DOCUMENTS 5,840,799 A * 11/1998 Mayer et al. ................ 524/507

FOREIGN PATENT DOCUMENTS

| DE | 35 45 618 A1 | 12/1985 | ............. C09D/3/72 |
| DE | 36 36 183 A1 | 10/1986 | ............. C09D/5/38 |
| DE | 38 13 866 A1 | 4/1988 | ............. C09D/3/72 |
| DE | 38 32 826 A | 9/1988 | ......... C08F/220/10 |
| DE | 40 05 961 A | 2/1990 | ............. B05D/7/16 |
| DE | 41 10 520 A1 | 10/1992 | ......... C09D/201/00 |
| DE | 43 28 092 A1 | 8/1993 | ......... C09D/175/04 |
| DE | 43 39 870 A1 | 11/1993 | ......... C09D/151/08 |
| EP | 0 328 037 A2 | 2/1989 | ............. C09D/3/48 |
| EP | 0 355 433 A2 | 7/1989 | ........... C08G/18/08 |
| EP | WO 92/17554 | 10/1992 | ............. C09D/7/14 |
| WO | WO 94/07960 | * 4/1994 | |

* cited by examiner

Primary Examiner—Patrick D. Niland

(57) ABSTRACT

A mixer system, for preparing two-component water-dilutable coating agents, includes a plurality of substantially water-free base colors and a pigment-free aqueous component. One or more of the base colors can be mixed together with a suitable amount of the aqueous component to match a preexisting coating color on a substrate to be repaired. Each of the base colors includes a pigment, an organic solvent and a first binder. The pigment-free aqueous component includes water and a second binder. The second binder is a polymer made from a mixture which includes a monomer component, an initiator, and an aqueous dispersion of a polyurethane resin. Cured coatings which are prepared from compositions using the disclosed mixer system exhibit improved condensation resistance, as compared with previously known coatings.

21 Claims, No Drawings

MIXING SYSTEM FOR PRODUCING WATER-DILUTABLE COATING AGENTS

FIELD OF THE INVENTION

The present invention relates to a mixer system for preparing water-dilutable coating compositions with precisely defined tinting from various base colors, the resultant coating compositions having improved condensation resistance.

PRIOR ART

Conventional methods of repairing damaged areas on a single- or multicoat paint system comprise the careful cleaning and sanding, possibly filling and surfacing of the damaged area. Subsequently the damaged area, after a further pretreatment if appropriate, is sprayed with effect finishes, such as metallic basecoats, or with solid-color paints in such a way that the paint hides the damaged area and runs into the adjacent regions. After initial drying of the coating thus produced, the coating and the adjacent parts are oversprayed with a clearcoat and, after a flash-off period which may or may not be necessary, the clearcoat—together with the previously applied coats—is dried, preferably at temperatures between 50 and 100° C.

The paints used as effect finishes, and/or as solid-color paints applied in the two-coat process, for repairing damaged areas are usually low-solids paints which comprise, in addition to binders, coloring pigments and/or special-effect pigments and a high proportion of organic solvent mixtures.

These paints are either supplied by the paint manufacturer in the desired shade, or the shade is produced prior to application from a mixture system comprising a plurality of base colors. This preparation from a mixer system has the advantage that it is not necessary for every shade to be produced and stored individually, and that as a result production, distribution and stock-keeping costs can be reduced. In both cases it is necessary for the paint supplied to have an adequate shelf life (at least 12 months). For a mixer system, moreover, the accuracy of shade of the base colors is very important.

Whereas in the sector of production-line finishing use is increasingly made of water-thinnable basecoats, conventional, i.e. solvent-containing, basecoats are still employed in the automotive refinishing sector. These low-solids basecoats which have been used to date for refinishing have a distinctly different composition from the water-thinnable basecoats used hitherto for production-line finishing. Thus, for example, the rheology of conventional systems is very largely controlled by the rate of evaporation of the organic solvents (increase in solids between application device and the object to be painted), while the rheology of aqueous systems is controlled by external thickeners or by appropriate modifications to the binder. For the transition from conventional to water-thinnable systems, therefore, it is not sufficient simply to exchange the binders used for water-thinnable binders. For economic reasons, to improve safety at work (fire protection) and to reduce the pollution to the environment as paint films dry, the refinishing sector has not been excluded from attempts to reduce, as far as possible, the level of organic solvents in the coating compositions. However, the poor shelf life of the known water-thinnable basecoats has so far prevented the putting together of an above-described mixer system from water-thinnable basecoats of this kind.

DE-A 41 10 520 provides a mixer system which permits the preparation of water-thinnable coating compositions with precisely defined tinting from various base colors. In particular, this mixer system permits the preparation of aqueous coating compositions which are suitable for the refinishing, in particular, of damaged areas on car bodies. At the same time it ensures a high accuracy of shade of the base colors, which allows the paint shop to establish the desired shades in a precise and reproducible manner without recourse to complex measures.

In addition, the mixer systems of DE-A 41 10 520 are of very good shelf life (>12 months), and, finally, the aqueous coating compositions prepared using this mixer system lead, both in the case of effect finishes and in the case of solid colors, to coatings having good mechanical properties. Mixer systems in accordance with DE-A 41 10 520 consist of:

A) various base colors A, which contain less than 5% by weight of water, at least one coloring and/or special-effect pigment, organic solvent, at least one water-thinnable or water-dispersible binder and, if desired, auxiliaries and additives, and B) at least one water-containing, pigment-free component B.

Also embraced by DE-A 41 10 520 is a process for preparing water-thinnable coating compositions with precisely defined tinting, in which various base colors of a mixer system are prepared separately and stored and are not mixed until shortly before the application of the coating composition, characterized in that the mixer system of the invention is employed.

Finally, DE-A 41 10 520 also relates to the use of mixer systems for preparing aqueous coating compositions for refinishing, especially for preparing waterborne paints for the refinishing, in particular, of car bodies.

In recent times, the requirements for water and moisture resistance, especially for condensation resistance, of automotive refinishes have risen.

This has made it necessary to increase further the condensation resistance of the coatings which can be obtained with the mixer system according to DE-A 41 10 520.

SUMMARY OF THE INVENTION

It has surprisingly been found that the condensation resistance of finished coatings produced from the mixer systems of the general type described in DE-A 41 10 520 can be increased considerably if the mixing component B) described therein has added to it, as binder, a polymer which is obtainable by subjecting an ethylenically unsaturated monomer or a mixture of ethylenically unsaturated monomers to free-radical polymerization in the presence of a water-insoluble initiator and in an aqueous dispersion of a polyurethane resin which has a number-average molecular weight of between 1000 and 30,000 daltons and on average from 0.05 to 1.1 polymerizable double bonds, wherein the weight ratio between the polyurethane resin and the ethylenically unsaturated monomer or monomer mixture is between 1:10 and 10:1. Such polymers are described in DE-A 43 39 870.

DETAILED DESCRIPTION

The mixer system of the invention therefore consists of the components:

A) a plurality of base colors A, which contain less than 5% by weight of water, at least one coloring and/or special-effect pigment, organic solvent, at least one water-thinnable or water-dispersible first binder and, if desired, auxiliaries and additives, and B) at least one water-containing, pigment-free component B, comprising an aqueous dispersion of a polyurethane resin.

Component A of the Mixer System

In the text below, the individual components of the mixer system of the invention will now be elucidated further.

Component A of the mixer system can comprise any customary paint pigment, provided that it does not react with water within a short time (the period between stirring components A and B together and applying the paints) and that it does not dissolve in water. The component A can comprise special-effect pigments and/or colored pigments based on inorganic or organic compounds. To ensure a scope for application which is as universal as possible and to allow the realization of as many colors as possible, it is preferred to put together a mixer system based on a first subgroup of components A comprising only coloring pigments and on a second subgroup of components A comprising only special-effect pigments. To prepare the component A it is possible to employ all special-effect pigments which are commonly employed in the formulation of aqueous coating compositions. Examples of suitable special-effect pigments are commercial aluminum bronzes, the aluminum bronzes chromated in accordance with DE-A 36 36 183, commercial stainless steel bronzes, and other customary metal platelets and metal flake pigments. Nonmetallic special-effect pigments, such as pearluster pigments or interference pigments, for example, are also suitable for preparing component A.

Examples of suitable coloring pigments based on inorganic compounds are titanium dioxide, iron oxides, carbon black and the like. Examples of suitable coloring pigments based on organic compounds are Indanthrene blue, Cromophthal red, Irgazine orange, Sicotrans yellow, Heliogen green and the like.

Binders suitable for use as the first binder hereof in component A are all water-thinnable or water-dispersible binders which are commonly employed in aqueous coating compositions and which can be prepared in the form of organic solutions.

As used throughout the specification, the terms "water-thinnable" and "water-dilutable " are used interchangeably and have the same meaning, i.e., mixable with water to form dispersions which are substantially homogeneous, as viewed with the unaided eye.

In this context, the water-thinnability or water-dispersibility of the resins can also be established by using appropriate solubilizers as cosolvent or solvent. Decisive factors for the selection of the binders are, on the one hand, a good shelf life in organic solution, including in particular the ability to inhibit settling of the pigments, and, on the other hand, the ease of incorporation of the base color into the component B, or the ease of incorporation of component B into the base color. The incorporability of the base color into component B, or vice versa, can, it is true, also be controlled by the use of dispersing additives, such as ionic or nonionic surfactants, for example. Additives of this kind, however, should be used in very small amounts so as not to impair the water resistance of the resulting coatings. As binders for component A use is made in particular of water-thinnable or water-dispersible polyurethane resins, polyacrylate resins, polyester resins and amino resins that can be prepared in organic solution, and of mixtures thereof.

The polyurethane resins employed as binders in the base colors are known in principle. Suitable examples are the polyurethane resins described in the literature for use in waterborne paints, provided that these polyurethane resins— in modification of the preparation described in the respective literature—can be prepared in the form of organic solutions.

Examples of suitable polyurethane resins are the resins described in the following documents; EP-A 0 355 433, DE-A 35 45 618, DE-A 38 13 866 and DE-A 40 05 961.

For further details of the preparation of the polyurethane resins, and examples of suitable compounds, therefore, reference is made to these documents. However, in contrast to the polyurethane resins described in these documents, the polyurethane resins hereof are employed not in the form of an aqueous dispersion but as a solution in one or more organic solvents. This means that the preparation process of the polyurethane resins employed in accordance with the invention has been modified relative to the processes described in these documents insofar as, rather than the preparation of a secondary dispersion, the polyurethane resins are dissolved in organic solvents. Regarding the properties of the composition and the preparation of such polyurethanes in detail reference is made to DE-A 41 10 520.

The polyacrylate resins employed as binders for component A are likewise known and are described, for example, in DE-A 38 32 826. Suitable polyacrylate resins are those general water-thinnable or water-dispersible resins which can be prepared in the form of organic solutions.

Also suitable as binders for component A are polyester resins which are water-thinnable or water-dispersible and can be prepared in the form of organic solutions. Use is made, for example, of corresponding commercial water-thinnable or water-dispersible polyester resins and of the polyester resins commonly employed in waterborne paints.

Water-thinnable or water-dispersible amino resins are also suitable as binders for component A. Water-thinnable melamine resins are preferably employed. These are, in general, etherified melamine-formaldehyde condensation products. The water-solubility of the amino resins depends—apart from the degree of condensation, which should be as low as possible—on the etherifying component, with only the lowest members of the alcohol or ethylene glycol monoether series giving water-soluble condensates. The greatest importance is possessed by the methanol-etherified melamine resins. If solubilizers are used, it is also possible to disperse butanol-etherified melamine resins in the aqueous phase. A further possibility consists in inserting carboxyl groups into the condensate. Transetherification products of highly etherified formaldehyde condensates with oxycarboxylic acids are soluble in water after neutralization, owing to their carboxyl groups, and may be present in the base colors. As binders in the base colors A it is of course also possible to employ mixtures of the abovementioned binders and, in addition or alone, other water-thinnable or water-dispersible binders. As binders, the base colors A preferably comprise water-thinnable polyurethane resins or water-thinnable amino resins or mixtures of water-thinnable polyurethane resins and amino resins.

It is essential to the invention that the base colors A are essentially, and preferably completely, free of water. The water content of the base colors should be less than 5% by weight, based on the overall weight of the base color.

As solvents the base color comprises one or more organic solvents. Examples of suitable solvents are, in particular, water-soluble or water-thinnable solvents, such as alcohols, esters, ketones, keto esters, glycol ether esters, and the like. It is preferred to employ alcohols and glycol ethers, with particular preference butyl glycol and butanols.

In this context, the possibility exists of preparing the actual binders using solvents which will also remain subsequently as solvents in the base color. More frequently, however, a different solvent is used to prepare the binders, and following binder preparation it is removed gently by vacuum distillation or thin-film evaporation and replaced by a solvent which remains in the binder solution that is then employed in the base color. Higher-boiling solvents should be soluble in water and remain in the polyurethane resin solution that is employed in the base color, in order to facilitate the coalescence of polymer particles in the course of film formation. Thus, for example, the preparation of the polyurethane resin solution takes place in a ketone, such as methyl ethyl ketone or acetone, for example. Then, following the addition of butyl glycol, solvent exchange takes place by distillative removal of ketone (methyl ethyl ketone, acetone). Particularly preferred solvents for preparing the polyurethane resin are those which do not need to be exchanged (no active hydrogen) and which can remain in component A, such as, for example, methoxypropyl acetate, ethoxyethyl acetate, ethoxyethyl propionate and N-methylpyrrolidine. If desired, these solvents for preparing the polyurethane resins can also be employed in a mixture with ketones, although the ketones do not remain in the base color but are exchanged following preparation of the polyurethane resin. Component A may, furthermore, include customary auxiliaries and additives as well. Examples of such additives are defoamers, dispersing auxiliaries, emulsifiers, leveling agents and others.

Component A is prepared by methods known to the skilled worker, by mixing and, if desired, dispersing the individual components. Thus the incorporation of coloring pigments usually takes place by dispersing the respective pigments with one or more of the above-described binders, which are preferably employed in the form of solutions in organic solvents. If desired, further organic solvent can be added for dispersing. The dispersing of these pigments takes place with the aid of customary equipment, such as bead mills and sand mills, for example.

The incorporation of special-effect pigments usually takes place by homogeneous mixing of the effect pigments with one or more solvents. This mixture is then stirred into a mixture of one or more of the above-described binders, with or without the addition of further organic solvents, by means of a stirrer or dissolver. The binders are preferably employed in the form of their solutions in organic solvents.

The respective proportions of pigments, binders and solvents are guided, as the skilled worker is aware, by the flow properties of the pigment paste and are therefore dependent on the particular pigment used.

Component B of the Mixer System

A further constituent of the mixer system is the water-containing component B.

As a constituent essential to the invention, component B comprises as a second binder a polymer of the general type which is described in DE-A 43 49 870 and is obtainable by subjecting an ethylenically unsaturated monomer or a mixture of ethylenically unsaturated monomers to free-radical polymerization in the presence of a water-insoluble initiator or of a mixture of water-insoluble initiators and in an aqueous dispersion of a polyurethane resin which has a number-average molecular weight Mn of from 1000 to 30,000 daltons and contains on average from 0.05 to 1.1 polymerizable double bonds per molecule, wherein the weight ratio between the polyurethane resin and the ethylenically unsaturated monomer or the mixture of ethylenically unsaturated monomers is between 1:10 and 10:1.

The aqueous dispersion of the polyurethane resin in which the ethylenically unsaturated monomer or the mixture of ethylenically unsaturated monomers is subjected to free-radical polymerization in the presence of a water-insoluble initiator or of a mixture of water-insoluble initiators can be prepared, according to DE-A 43 39 870, by preparing, from (a) a polyester- and/or polyetherpolyol having a number-average molecular weight of from 400 to 5000, or a mixture of such polyester- and/or polyetherpolyols, and (b) a polyisocyanate or a mixture of polyisocyanates, alone or together with a monoisocyanate or a mixture of monoisocyanates, and (c) a compound whose molecule comprises at least one group which is reactive toward isocyanate groups and at least one group which is capable of forming anions, or a mixture of such compounds, or (d) a compound whose molecule comprises at least one NCO-reactive group and at least one poly(oxyalkylene) group, or a mixture of such compounds, or (e) a mixture of components (c) and (d), and (f) if desired, a compound which in addition to a polymerizable double bond comprises at least one further NCO-reactive group, or a mixture of such compounds, and (g) if desired, a hydroxyl- and/or amino-containing organic compound having a molecular weight of from 60 to 399, or a mixture of such compounds, a polyurethane resin which has a number-average molecular weight of from 1000 to 30,000, preferably from 1500 to 20,000 and contains on average from 0.05 to 1.1, preferably from 0.2 to 0.9 polymerizable double bonds, and dispersing said resin in water.

The polyurethane resin can be prepared either in bulk or in organic solvents.

The polyurethane resin can be prepared by simultaneous reaction of all starting compounds. In many cases, however, it is judicious to prepare the polyurethane resin in stages. Thus it is possible, for example, to prepare from components (a) and (b) an isocyanate-functional prepolymer which is then reacted further with component (c) or (d) or (e). It is also possible to prepare from components (a) and (b) and (c) or (d) or (e) and, if used, (f) an isocyanate-functional prepolymer which can then be reacted with component (g) to form a polyurethane resin of higher molecular mass. The reaction with component (g) can be carried out in bulk or—as described, for example, in EP-A 0 297 576—in water. In cases where the compound employed as component (f) contains only one group which is reactive toward isocyanate groups, it is possible in a first stage to prepare from (b) and (f) an isocyanate-functional precursor which can subsequently be reacted further with the other components.

The reaction of components (a) to (g) can also be conducted in the presence of catalysts, such as dibutyltin dilaurate, dibutyltin maleate and tertiary amines, for example.

The amounts of component (a), (b), (c), (d), (e), (f) and (g) to be employed result from the target number-average molecular weight and from the target acid number. The polymerizable double bonds can be introduced into the polyurethane molecules by using components (a) having polymerizable double bonds and/or components (b) having polymerizable double bonds, and/or by using component (f). It is preferred to introduce the polymerizable double bonds by way of component (f). It is also preferred to introduce acrylate, methacrylate or allyl ether groups into the polyurethane resin molecules as groups containing polymerizable double bonds.

As component (a) it is possible to employ saturated and unsaturated polyester- and/or polyetherpolyols, especially polyester- and/or polyetherdiols having a number-average molecular weight of from 400 to 5000. For details regarding components (a) reference is made to DE-A 43 39 870.

As component (b) it is possible to employ aliphatic and/or cycloaliphatic and/or aromatic polyisocyanates. Examples of aromatic polyisocyanates are phenylene diisocyanate, tolylene diisocyanate, xylylene diisocyanate, biphenylene diisocyanate, naphthylene diisocyanate and diphenylmethane diisocyanate. On the basis of their good resistance to ultraviolet light, (cyclo)aliphatic polyisocyanates give rise to products having little tendency to yellow. For details regarding components (b) reference is made to DE-A 43 39 870.

In order to be able to form a stable dispersion in water from the polyurethane resin under discussion, it must contain hydrophilic groups. These hydrophilic groups are introduced through component (c) or component (d) or component (e) into the polyurethane resin. The groups of component (c) which are capable of forming anions are neutralized, prior to or during the dispersion of the polyurethane resin in water, with a base, preferably with a tertiary amine, such as dimethylethanolamine, triethylamine, tripropylamine and tributylamine, for example, so that following neutralization the polyurethane resin contains anionic groups. Where component (c) exclusively is employed as the component which supplies hydrophilic groups, component (c) is employed in an amount such that the polyurethane resin has an acid number of from 15 to 80 mg of KOH/g, preferably from 20 to 60 mg of KOH/g. Where component (d) exclusively is employed as the component which supplies hydrophilic groups, component (d) is employed in an amount such that the polyurethane resin contains from 5 to 40, preferably from 10 to 30% by weight of oxyalkylene groups, this figure including any oxyalkylene groups introduced by component (a). Where component (e) is employed as the component which supplies hydrophilic group, the amounts of component (c) and (d) to be employed, in accordance with the proportion of the mixture, lie between the values indicated above for the cases where component (c) or (d), respectively, are employed as sole supplier of hydrophilic groups. For the rest, the skilled worker can readily determine the amounts of component (c), (d) or (e) to be employed, by means of simple routine experiments. Said worker is required merely to examine, by means of simple serial experiments, how high the proportion of hydrophilic groups must be, at least, in order to obtain a stable aqueous polyurethane resin dispersion. Said worker can also of course use common dispersing auxiliaries, such as emulsifiers, as well in order to stabilize the polyurethane resin dispersions. The use of dispersing auxiliaries as well, however, is not preferred, since it generally raises the sensitivity of the resulting coatings to moisture. As component (c) it is preferred to employ compounds whose molecule comprises two groups which are reactive toward isocyanate groups. Suitable groups which are reactive toward isocyanate groups are, in particular, hydroxyl groups, and also primary and/or secondary amino groups. Suitable groups capable of forming anions are carboxyl groups, sulfonic acid groups and/or phosphonic acid groups, carboxyl groups being preferred. For details regarding components (c) reference is made to DE-A 43 39 870.

With the aid of component (d) it is possible to introduce poly(oxyalkylene) groups, as nonionic stabilizing groups, into the polyurethane molecules. As component (d) it is possible, for example, to employ: alkoxypoly(oxyalkylene) alcohols with the general formula R'O—(—CH$_2$CHR"—O—)$_n$—H in which R' stands for an alkyl radical having 1 to 6 carbon atoms, R" stands for a hydrogen atom or an alkyl radical having 1 to 6 carbon atoms and n stands for a number between 20 and 75.

Component (f) serves to introduce polymerizable double bonds into the polyurethane resin molecules. It is preferred to employ as component (f) a compound which contains at least one NCO-reactive group and a polymerizable double bond. Compounds employed with particular preference as component (f) are those comprising a polymerizable double bond but also two NCO-reactive groups. Examples of NCO-reactive groups are —OH, —SH, >NH and —NH$_2$ groups, preference being given to —OH, >NH and NH$_2$ groups. Examples of compounds which can be employed as component (f) are: hydroxy(meth)acrylates, especially hydroxyalkyl (meth)acrylates, such as hydroxyethyl, hydroxypropyl, hydroxybutyl or hydroxyhexyl (meth)acrylate and 2,3-dihydroxypropyl (meth)acrylate, 2,3-dihydroxypropyl monoallyl ether, allyl 2,3-dihydroxypropanoate, glycerol mono(meth)acrylate, glycerol, monoallyl ether, pentaerythritol mono(meth)acrylate, pentaerythritol di(meth)acrylate, pentaerythritol monoallyl ether, pentaeythritol [sic] diallyl ether, trimethylolpropane monoallyl ether, trimethylolpropane mono (meth) acrylate and trimethylolpropane diallyl ether. As component (f) it is preferred to employ trimethylolpropane monoallyl ether, glycerol mono(meth)acrylate, pentaerythritol di(meth)acrylate, pentaerythritol dially [sic] ether, glycerol monoallyl ether and trimethylolpropane mono(meth)acrylate. It is particularly preferred as component (f) to employ trimethylolpropane monoallyl ether, glycerol monoallyl ether and allyl 2,3-dihydroxypropanoate. It is preferred to incorporate those (f) components containing at least two NCO-reactive groups into the polyurethane molecules at sites along the chain (not at the ends).

As component (g) it is possible, for example, to employ polyols having molecular weights of between 60 and 399, such as, for example, ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, di-trimethylolpropane ether, pentaerythritol, 1,2-cyclohexanediol, 1,4-cyclohexanedimethanol, bisphenol A, bisphenol F, neopentyl glycol, neopentyl glycol hydroxypivalate, hydroxyethylated or hydroxypropylated bisphenol A, hydrogenated bisphenol A and mixtures thereof. The polyols are generally employed in amounts of up to 30 percent by weight, preferably from 2 to 20 percent by weight, based on the amount of component (a) and (g) employed.

As component (g) it is also possible to employ di- and/or polyamines having primary and/or secondary amino groups. Polyamines are mainly alkylene-polyamines having molecular weights of between 60 and 399. They can carry substituents which have no hydrogen atoms that are reactive with isocyanate groups. Examples are polyamines with a linear or branched aliphatic, cycloaliphatic or aromatic structure and at least two primary amino groups. Diamines which can be mentioned are hydrazine, ethylenediamine, propylenediamine, 1,4-butylenediamine , piperazine, 1,4-cyclohexyldimethylamine, 1,6-hexamethylenediamine, trimethylhexamethylenediamine, methanediamine, isophoronediamine, 4,4'-diaminodicyclohexylmethane and aminoethylethanolamine. Preferred diamines are hydrazine, alkyl or cycloalkyl diamines, such as propylenediamines and 1-amino-3-aminomethyl-3,5,5-trimethylcyclohexane. It is also possible as component (g) to employ polyamines containing more than two amino groups per molecule. In such cases, however, it should be ensured—by means, for example, of the additional use of monoamines—that no crosslinked polyurethane resins are obtained. Polyamines of this kind which can be used are diethylenetriamine, triethylenetetramine, dipropylenetriamine and dibutylenetriamine. Ethylhexylamine is mentioned as an example of a monoamine.

The binder present in component B of the invention is obtainable by subjecting an ethylenically unsaturated monomer or a mixture of ethylenically. unsaturated monomers to free-radical polymerization in the presence of a water-insoluble initiator or of a mixture of water-insoluble initiators and in the aqueous polyurethane resin dispersion described above, the weight ratio between the polyurethane resin and the ethylenically unsaturated monomer or the mixture of ethylenically unsaturated monomers lying between 1:10 and 10:1, preferably between 1:2 and 2:1.

Ethylenically unsaturated monomers which can be employed are:

(i) aliphatic or cycloaliphatic esters of acrylic acid or methacrylic acid, which contain neither hydroxyl nor carboxyl groups, or a mixture of such esters, and (ii) ethylenically unsaturated monomers which carry at least one hydroxyl group in the molecule, or a mixture of such monomers, and (iii) ethylenically unsaturated monomers which carry at least one carboxyl group in the molecule, or a mixture of such monomers, and (iv) further ethylenically unsaturated monomers, which are different from (i), (ii) and (iii), or a mixture of such monomers, and (v) polyunsaturated monomers, especially ethylenically polyunsaturated monomers and also mixtures of components (i), (ii), (iii), (iv) and (v).

As ethylenically unsaturated monomers it is preferred to employ mixtures which [lacuna] of from 40 to 100% by weight, preferably from 60 to 90% by weight of component (i), from 0 to 30% by weight, preferably from 0 to 25% by weight of component (ii), from 0 to 10% by weight, preferably from 0 to 5% by weight and, with very particular preference, 0% by weight of component (iii) and from 0 to 50% by weight, preferably from 0 to 30% by weight of component (iv) and also from 0 to 5% by weight, preferably 0% by weight of component (v), the sum of the proportions by weight of (i), (ii), (iii), (iv) and (v) always giving 100% by weight.

As component (i) it is possible, for example, to employ: cyclohexyl acrylate, cyclohexyl methacrylate, alkyl acrylates and alkyl methacrylates having up to 20 carbon atoms in the alkyl radical, such as methyl, ethyl, propyl, butyl, hexyl, ethylhexyl, stearyl and lauryl acrylate and methacrylate, or mixtures of these monomers.

As component (ii) it is possible, for example, to employ: hydroxyalkyl esters of acrylic acid, methacrylic acid or another α,β-ethylenically unsaturated carboxylic acid. These esters can be derived from an alkylene glycol, which is esterified with the acid, or can be obtained by reacting the acid with an alkylene oxide. As component (ii) it is preferred to employ hydroxyalkyl esters of acrylic acid and methacrylic acid in which the hydroxyalkyl group contains up to 6 carbon atoms, or mixtures of these hydroxyalkyl esters. Examples relating to this can be taken from DE-A 43 39 870.

As component (iii) it is preferred to employ acrylic acid and/or methacrylic acid. It is also possible, however, to employ other ethylenically unsaturated acids having up to 6 carbon atoms in the molecule. Examples of such acids are ethacrylic acid, crotonic acid, maleic acid, fumaric acid and itaconic acid. As component (iv) it is possible, for example, to employ: vinylaromatic hydrocarbons, such as styrene, α-alkylstyrene and vinyltoluene, acryl- and methacrylamide and acryl- and methacrylonitrile, or mixtures of these monomers.

As components (v) it is possible to employ compounds comprising at least two free-radically polymerizable double bonds in the molecule. Examples are: divinylbenzene, p-methyldivinylbenzene, o-nonyl-divinylbenzene, ethanediol di(meth)acrylate, 1,4-butanediol di(meth) acrylate, 1,6-hexanediol di(meth)acrylate, trimethylolpropane tri(meth)acrylate, pentaerythritol di(meth)acrylate, allyl methacrylate, diallyl phthalate, butanediol divinyl ether, divinylethyleneurea, divinylpropyleneurea, diallyl maleate, etc.

As water-insoluble initiators it is possible, for example, to employ water-insoluble azo compounds and water-insoluble peroxy compounds. Examples of water-insoluble azo compounds are 2,2-azo-bis(isobutyronitrile), 2,2'-azo-bis (isovaleronitrile), 1,1'-azo-bis(cyclohexanecarbonitrile) and 2,2'-azo-bis-(2,4-dimethylvaleronitrile). Examples of water-insoluble peroxy compounds are t-amyl peroxyethylhexanoate, t-butyl peroxyethylhexanoate, dilauryl peroxide, dibenzoyl peroxide and 1,1-dimethyl-3-hydroxybut-1-yl peroxyethylhexanoate.

It is of course of course also possible to add polymerization regulators.

The polymerization of the ethylenically unsaturated monomer or of the mixture of ethylenically unsaturated monomers can be carried out by adding the ethylenically unsaturated monomer or the mixture of ethylenically unsaturated monomers slowly to the aqueous polyurethane resin dispersion. In this case it is possible either to add the total amount of the monomers at once or initially to charge only a portion and to meter in the remainder in the course of the reaction. The monomers to be polymerized can also, however, be formed into a preemulsion with the aid of part of the polyurethane resin dispersion and water, and this preemulsion is then added slowly to the initial charge. The feed time of the monomers to be polymerized is generally from 2 to 8, preferably from about 3 to 4 hours.

The water-insoluble initiators can be added to the initial charge or added dropwise together with the monomers. They can also be added proportionally to the initial charge which comprises a portion of the monomers. The remainder of initiator is then metered in with the remaining monomers. The reaction temperature results from the rate of decomposition of the initiator or initiator mixture and can be reduced if desired by means of suitable organic redox systems. The polymerization of the ethylenically unsaturated monomer or of the mixture of ethylenically unsaturated monomers takes place in general at a temperature from 30 to 100° C., in particular at a temperature from 60 to 95° C. If operating at superatmospheric pressure, the reaction temperatures may rise above 100° C.

The ethylenically unsaturated monomer or the mixture of ethylenically unsaturated monomers is to be selected such that the binder polymers obtained in he manner described above have a hydroxyl number of from 0 to 100 mg of KOH/g, preferably from 0 to 80 mg KOH/g and an acid number of from 10 to 40 mg of KOH/g, preferably from 15 to 30 mg of KOH/g.

The component B preferably comprises at least one rheology-controlling additive. If desired, component 3 may also comprise further auxiliaries and additives, one or more water-thinnable or water-dispersible binders, and organic solvents.

The rheology-controlling additive employed comprises phyllosilicates, crosslinked polymeric microparticles, as are disclosed, for example, in EP-A 0 038 127, and other customary Theological additives, and mixtures thereof. Particularly preferred thickeners are phyllosilicates modified with protective colloids, as are described, for example, in DE-A-37 07 388, and synthetic polymers having ionic and/or associative groups, such as polyvinyl alcohol, poly (meth)acrylamide, poly(meth)acrylic acid, polyvinylpyrrolidone, styrene-maleic anhydride or ethylene-maleic anhydride copolymers and their derivatives, or else hydrophobically modified ethoxylated urethanes or polyacrylates. Very particular preference is given as thickeners to the use of carboxyl-containing polyacrylate copolymers having an acid number of from 60 to 780 mg of KOH/g, preferably from 200 to 500 mg of KOH/g, or mixtures thereof with the above-described modified phyllosilicates.

Suitable as further binder constituents in component B are the water-thinnable or water-dispersible polyurethane, polyacrylate, polyester and amino resins already set out in connection with the description of component A; consequently, reference is made here only to the aforegoing description. In contradistinction to the use of these resins in component A, when used in component B these binders can be employed not only as an organic solution but also, preferably, in water-containing form. This conversion of the resins to the aqueous phase takes place, for example, by neutralizing the carrier groups (groups capable of forming anions or cations, such as carboxyl groups, for example) and then carrying out dilution with water, with or without prior partial removal of the organic solvent employed in preparing the resin, or by direct synthesis of the resin in the presence of water. For further details reference is made to the literature in which the preparation of the resins is described (cf. e.g. DE-A 32 10 051, DE-A 26 24 442, DE-A 37 39 332, US-A 4,719,132, EP-A 0 089 497, US-A 4,558,090, US-A 4,489,135, EP-A 0 038 127, DE-A 36 28 124, EP-A 0 158 099, DE-A 29 26 584, EP-A 0 195 931 and DE-A 33 21 180).

Also suitable, furthermore, as further binder constituents for component B are water-thinnable or water-dispersible polyurethane resins which cannot be prepared in the form of organic solutions. These are, in particular, polyurethane resins in which the NCO-functional prepolymer has been reacted with a polyamine as modifying agent. Regarding further description of such polyurethane resins reference is made to DE-A 41 10 520.

Also suitable, furthermore, as further water-thinnable or water-dispersible binder constituents for component B are the water-thinnable emulsion polymers described in DE-A 38 41 540. These emulsion polymers are described in more detail in DE-A 41 10 520. Component B may also, if desired, include one or more organic solvents and also, if desired, further customary auxiliaries and additives. Examples of suitable organic solvents are the solvents already set out in connection with the description of component A. The content of organic solvent is usually from 0 to 3% by weight, based on the overall weight of component B. Examples of suitable auxiliaries and additives are likewise the additives mentioned in connection with the description of component A. The amount of these additives employed is usually from 0 to 10% by weight, based on the overall weight of component B.

The Mixer System

The mixer system of the invention consists of various pigment-containing base colors (component A) and at least one water-containing component B. Depending on the desired shade of the aqueous coating composition, then, the aqueous coating composition is prepared by mixing one or more base colors of the mixer system with at least one water-containing component B directly prior to the application of the aqueous coating composition. Typical mixer systems consist of from 15 to 60, preferably from 20 to 40, different base colors and of from 1 to 5, preferably from 1 to 3, different components B.

With regard to the description of customary mixing machines for the stock-keeping and storage of the base colors and mixtures, reference is made only to the literature, such as, for example, to the Glasurit-Handbuch, 11th edition, Kurt R. Vincentz-Verlag, Hanover 1984, pages 544 to 547.

Preferred mixer systems of the invention are obtained if the base colors employed as component A comprise Aa) from 0.5 to 70% by weight of at least one special-effect pigment and/or of at lea5t one coloring pigment, Ab) from 10 to 80% by weight of at least one water-thinnable or water-dispersible binder, and Ac) at least one organic solvent, the sum of the proportions by weight of components Aa to Ac being in each case 100% by weight.

In addition, the base colors may also contain from 0 to 10% by weight, based on the overall weight of component A, of customary auxiliaries and additives. With particular preference the mixer system is composed of base colors containing only special-effect pigments and of base colors containing only coloring pigments. Particularly preferred base colors (component A) based on special-effect pigments comprise Aa) from 0.5 to 50% by weight of at least one special-effect pigment, Ab) from 20 to 80% by weight of at least one water-thinnable or water-dispersible binder, and Ac) at least one organic solvent, the sum of the proportions by weight of components Aa to Ac being in each case 100% by weight.

Particularly preferred base colors (component A) based on inorganic coloring pigments comprise Aa) from 1 to 70% by weight of at least one inorganic coloring pigment, Ab) from 10 to 80% by weight of at least one water-thinnable or water-dispersible binder, and Ac) at least one organic solvent, the sum of the proportions by weight of components Aa to Ac being in each case 100% by weight.

Particularly preferred base colors (component A) based on organic coloring pigments comprise Aa) from 1 to 30% by weight of at least one organic coloring pigment, Ab) from 10 to 80% by weight of at least one water-thinnable or water-dispersible binder, and Ac) at least one organic solvent, the sum of the proportions by weight of components Aa to Ac being in each case 100% by weight.

It is of course also possible to employ as component A base colors which comprise a combination of at least one organic coloring pigment and at least one inorganic coloring pigment.

As component B it is preferred to employ mixtures which comprise

Ba) from 60 to 98% by weight, preferably from 70 to 95% by weight, of water,

Bb) from 0 to 10% by weight, preferably from 0.1 to 5% by weight, of at least one rheology-controlling additive, this amount being based on the weight of the pure additive without solvent fraction, and Bc) from 2 to 39.9% by weight, preferably from 5 to 29.9% by weight, of the binder polymer according to DE-A 43 39 870 and, if desired, further water-thinnable or water-dispersible binders, the sum of the proportions by weight of components Ba to Bc being in each case 100% by weight.

To prepare the aqueous coating compositions, the various base colors A are mixed in a proportion which results in the desired shade. The mixing proportion of component A with the component or the various components B is defined by the requirement that the resulting coating composition, irrespective of the shade, has the desired viscosity, the desired solids content and the desired content of organic solvents, etc.

The solids content (amount of solid binder employed plus amount of pigment employed) and the content of organic solvent and the like varies with the intended use of the aqueous coating compositions.

In the sector of automotive refinishes, the solids content for metallic paints is preferably from 7 to 30% by weight and for solid-color paints is preferably from 10 to 45% by weight, based in each case on the overall weight of the aqueous coating compositions.

A preferred embodiment of the mixer system of the invention is a mixer system in which all base colors comprise the same binder or, in the case of a binder mixture, the same binders. With particular preference, all base colors of the mixer system have the same ratio of the amount of solid binder employed (i.e. excluding solvent) to the amount of organic solvent employed.

This ensures that—irrespective of the desired shade and hence irrespective of the mixing proportion of the various base colors—the resulting mixture of the various base colors always has the same binder:solvent ratio and hence, irrespective of the shade, exhibits an approximately consistent evaporation behavior (drying) and a similar rheology. This constant binder:solvent ratio in all base colors also ensures that, if appropriate, the ratio of binder (dissolved) to binder (dispersed) in the finished aqueous paint is constant. The use of various base colors having in each case an identical binder:solvent ratio has the practical advantage that irrespective of the particular shade desired the film properties obtained are constant.

The aqueous coating compositions prepared using the mixer system of the invention can be applied to a very wide variety of substrates, such as, for example, metal, wood, plastic or paper. The aqueous coating compositions prepared by means of the mixer system of the invention are particularly suitable for the repair painting of damaged areas, especially for automotive refinishing. In this case, directly after their preparation by mixing the components A and B, the coating compositions are applied to the damaged area prepared appropriately (for example, by filling and surfacing) by means of customary methods, especially spraying. The aqueous coating compositions prepared using the mixer system of the invention are preferably used to produce a basecoat.

After initial drying of the basecoat thus produced, at room temperature or by forced drying (e. g. 10 minutes at 60° C., 80° C. or IR drying), a suitable transparent topcoat composition is applied. Suitable topcoats include both organically dissolved and aqueous 1- or 2-component clearcoats and also transparent powder coatings. Frequently employed are 2-component clearcoats based on a hydroxyl-containing acrylate copolymer and on a polyisocyanate. Clearcoats of this kind are described, for example, in the patent applications DE-A 34 12 534, DE-A 36 09 519, DE-A 37 31 652 and DE-A 38 23 005. Suitable 1-component clearcoats, based for example on a hydroxyl-containing binder and on an amino resin hardener, are likewise known and are described, for example, in Kittel, Lehrbuch der Lacke und Beschichtungen, Volume IV; Verlag W.A. Colomb in der H. Heeremann [sic] GmbH, Berlin-Oberschwandorf 1976. All other clearcoats not mentioned explicitly here, however, are of course also suitable. After a flash-off period that may be necessary, of about 5 minutes, the basecoat is then dried together with the topcoat. When using 2-component clearcoats the drying takes place in general at temperatures of below 100° C., preferably of below 80° C. The dry film thicknesses of the basecoat are in general between 5 and 25 $\mu$m, those of the topcoat generally between 30 and 70 $\mu$m.

When 1-component clearcoats are used the basecoat is dried together with the topcoat at elevated temperatures, for example about 120° C. The dry film thicknesses of the topcoat are in this case in general between 30 and 50 $\mu$m.

The invention is elucidated further below with reference to working examples. The following examples are provided as illustrations of possible embodiments of the invention, and are not intended to be limitative. All information relating to parts and percentages in these examples is information by weight unless expressly noted otherwise.

EXAMPLES

1. Preparing the First Binder of the Invention for Component A

A suitable reaction vessel with stirrer, reflux condenser and feed vessel is charged under inert gas with 686.3 g of a polyester having a number-average molecular weight of 1400, based on a commercial unsaturated dimeric fatty acid (having an iodine number of 10 mg of $I_2$/g, a monomer content of not more than 0.1%, a trimer content of not more than 2%, an acid number of from 195 to 200 mg of KOH/g and a saponification number of from 197 to 202 mg of KOH/g), isophthalic acid and hexanediol, and, in succession, 10.8 g of hexanediol, 55.9 g of dimethylolpropionic acid, 344.9 g of methyl ethyl ketone and 303.6 g of 4,4'-di(isocyanatocyclohexyl)methane are added. This mixture is kept at reflux until the isocyanate content has fallen to 1.0%. Subsequently, 26.7 g of trimethylolpropane are added to the mixture which is then held under reflux to a viscosity of 12 dPas (in the case of a solution of 1:1=resin solution/N-methyl-pyrrolidone). Then 1378.7 g of butyl glycol are added. Following a vacuum distillation in which the methyl ethyl ketone is removed, the resin solution is neutralized with 32.7 g of dimethylethanolamine. The solids content of the resulting resin solution is 44%.

The resulting composition is diluted with butyl glycol to a solids content of 41%, with thorough stirring.

2. Preparing the Second Binder of the Invention for Component B

In a reaction vessel with stirrer, internal thermometer, reflux condenser and electrical heating, 178.5 g of a linear polyester (synthesized from dimerized fatty acid (Pripol® 1013), isophthalic acid and 1,6-hexanediol) having a hydroxyl number of 80 and a number-average molecular weight Mn of 1400 is dissolved, following the addition of 20.8 g of dimethylolpropionic acid and 7.4 g of trimethylolpropane monoallyl ether, in 44.6 g of N-methylpyrrolidone and 80.9 g of methyl ethyl ketone. Subsequently, at 45° C., 90.7 g of isophorone diisocyanate are added. After the exothermic reaction has subsided the mixture is heated slowly to 80° C. It is held at this temperature until the NCO content is 1.8%. Then, after cooling to 50° C., 14.9 g of triethylamine and 535.3 g of deionized water are added rapidly in succession. After 15 minutes, a mixture of 7.6 g of aminoethylethanolamine and 19.3 g of deionized water is added to the thoroughly dispersed resin. The temperature is subsequently raised to 60° C. and the methyl ethyl ketone is distilled off in vacuo. The dispersion thus obtained has a solids content of 34.3% by weight (60 minutes at 130° C.) and a pH of 8.0.

514.7 g of the polyurethane resin dispersion prepared above are diluted with 277.7 g of deionized water. After this diluted dispersion has been heated to 85° C., a mixture of 50.1 g of styrene 50.1 g of methyl methacrylate, 37.5 g of n-butylacrylate and 37.5 g of hydroxyethyl methacrylate is added slowly over the course of 3.5 hours. Concurrently with the beginning of the addition of this mixture, a solution of 2.6 g of tert-butyl peroxyethylhexanoate in 30 g of methoxypropanol is added over the course of 4 hours. The mixture is then held at 85° C. until the monomers have been fully consumed by reaction. Further initiator is added if required. Finally, any coagulant obtained is removed by filtration. The weight ratio of polyurethane resin to acrylate monomers is 1:1. The dispersion thus obtained shows very good stability on storage and has a solids content of 34.8% by weight (60 minutes at 130° C.) and a pH of 7.2.

3. Preparing a Polyurethane Resin Dispersion as Further Binder Constituent of the Component B A suitable reaction vessel with stirrer, reflux condenser and feed vessel is charged under inert gas with 686.3 g of a polyester having a number-average molecular weight of 1400, based on a commercial unsaturated dimeric fatty acid (having an iodine number of 10 mg of $I_2$/g, a monomer content of not more than 0.1%, a trimer content of not more than 2%, an acid number of from 195 to 200 mg of KOH/g and a saponification number of from 197 to 202 mg of KOH/g), isophthalic acid and hexanediol, and, in succession, 10.8 g of hexanediol, 55.9 g of dimethylolpropionic acid, 344.9 g of methyl ethyl ketone and 303.6 g of 4,4'-di(isocyanatocyclohexyl)methane are added. This mixture is kept at reflux until the isocyanate content has fallen to 1.0%. Subsequently, 26.7 g of trimethylolpropane are added to the mixture which is then held under reflux to a viscosity of 12 dPas (in the case of a solution of 1:1=resin solution/N-methyl-pyrrolidone). Any excess isocyanate present is destroyed by adding 47.7 g of butyl glycol. Subsequently, 32.7 g of dimethylethanolamine, 2688.3 g of deionized water and 193.0 g of butyl glycol are added to the reaction mixture with vigorous stirring. Following the removal of the methyl ethyl ketone by vacuum distillation, a dispersion is obtained which has a solids content of about 27%.

4. Preparing Various Base Colors A

In the text below, the mixer system of the invention is elucidated by way of example on the basis of the preparation of a blue metallic paint. Of course, the preparation of other shades necessitates differently pigmented base colors.

4.1. Preparing an Aluminum-containing Base Color A1

17.5 parts of an aluminum bronze chromated in accordance with DE-A 36 36 183 (aluminum content 65%, average particle diameter 15 μm) are distributed homogeneously in 16 parts of butyl glycol by stirring for 15 minutes and then are run with stirring into a mixture of 56.5 parts of the 41% strength, neutralized polyurethane resin solution of Example 1 and 10 parts of a commercial, methyl-etherified melamine resin (75% in isobutanol). This mixture is stirred for a further 30 minutes using a high-speed stirrer at 1000 rpm.

4.2. Preparing a Blue Pigmented Base Color A2

7.5 parts of Paliogen blue, 64 parts of the 41% strength, neutralized polyurethane resin solution of Example 1, 11.5 parts of a commercial, methyl-etherified melamine resin (75% in isobutanol) and 17 parts of butyl glycol are mixed with stirrer [sic] and dispersed using a sandmill.

5. Preparing the Pigment-free Component B 5.1. Preparing a Pigment-free Component B1 Comprising the Binder of the Invention in Accordance with Example 2

To 44 parts of the polyurethane resin dispersion of Example 2 there are added, with stirring, 51 parts of deionized water, 0.5 parts of a commercial defoamer and 4.5 parts of a 3.5% strength solution of a commercial polyacrylate thickener in water.

5.2. Preparing a Pigment-free Component B1' without a Binder of the Invention, Comprising the Binder of Example 3 (Comparison)

The procedure of Example 5.1. is repeated with the difference that 56.5 parts of the polyurethane resin dispersion of Example 3 and 38.5 parts of deionized water are employed.

The aqueous basecoat compositions 1 to 3 were prepared (as described in Table 1) from components A and components B, by stirring 6.5 parts of the base color 1 and 5.3 parts of the base color A2, directly following their preparation, into 88.2 parts of the respective mixture B1 and B1' (Comparison). The viscosity was subsequently adjusted by adding deionized water to a flow time of 20 s in the DIN4 cup (at 20° C.).

Directly following the preparation of the aqueous basecoat compositions they were applied by spraying in accordance with well-known methods to phosphated steel panels (Bonder 132) coated with a commercial electrodeposition coating and a Conventional (i.e. solvent-containing) or water-containing surfacer, overcoated, following a flash-off period of 30 minutes at room temperature (at a relative atmospheric humidity of 50% and a room temperature of 20° C.), with a commercial, conventional 2-component clearcoat based on a hydroxyl-containing acrylate copolymer and on an isocyanate crosslinker, and dried at 60° C. for 30 minutes. The dry film thickness of the basecoat composition is 15 μm, that of the clearcoat 50 μm.

Example 6

Testing the Adhesion of the Clearcoat Film

The clearcoat film is tested following exposure to condensation.

Adhesion testing of the clearcoat film exposed to condensation:

The adhesion test takes place after exposure to condensation, which is conducted in accordance with DIN 5001KK, by means of the crosshatch test in accordance with EN ISO 2409 after 0, 2 and 24 hours of regeneration.

TABLE

| Results of the adhesion tests | | |
|---|---|---|
| Basecoat | B1 | B1' |
| Adhesion condensation: | | |
| 0 hours of regeneration | 2 | 5 |
| 2 hours of regeneration | 1–2 | 4 |
| 24 hours of regeneration | 0 | 0 |

With otherwise comparable properties, the system with the basecoat comprising the component B1 of the invention, in comparison to the system comprising the component B1', exhibits a markedly higher condensation resistance.

What is claimed is:

1. Mixer system for preparing water-dilutable coating compositions with precisely defined tinting from a plurality of base color, said mixer system comprising:

A) a plurality of base colors A, each of which comprises less than 5% by weight of water, at least one pigment, an organic solvent, at least one water-dilutable first binder comprising an amino resin, and B) at least one pigment-free component B which comprises water and a second binder, wherein the second binder comprises at least one polymer which is obtained by subjecting a monomer component, selected from the group consisting of ethylenically unsaturated monomers and mixtures of ethylenically unsaturated monomers, to polymerization in the presence of an initiator selected from the group consisting of water-insoluble initiators and mixtures of water-insoluble initiators in an aqueous dispersion of a polyurethane resin, which has a number-average molecular weight between 1000 and 30,000 daltons, and which contains on average from 0.05 to 1.1 polymerizable double bonds, and further wherein the weight ratio between the polyurethane resin and the monomer component is between 1:10 and 10:1.

2. Mixer system according to claim 1, wherein the polyurethane resin employed for the preparation of the polymer is anionic and has an acid number of between 20 and 60 mg KOH/g.

3. Mixer system according to claim 1, wherein the polyurethane resin employed for the preparation of the polymer comprises a reactive constituent containing a polymerizable double bond, said reactive constituent being selected from the group consisting of acrylate, methacrylate and allyl ether groups.

4. Mixer system according to claim 1, wherein the base colors A are free of water.

5. Mixer system according to claim 1, wherein component B further comprises at least one rheology-controlling additive.

6. Mixer system according to claim 5, wherein said rheology-controlling additive comprises a carboxyl-containing polyacrylate copolymer having an acid number of from 60 to 780.

7. Mixer system according to claim 1, wherein at least one of the base colors A comprises, as a binder, at least one resin selected from the group consisting of polyurethane resins, amino resins, and mixtures thereof.

8. Mixer system according to claim 1, wherein each of the base colors A comprises:
Aa) from 0.5 to 70% by weight of at least one pigment,
Ab) from 10 to 80% by weight of at least one water-dilutable binder, and
Ac) at least one organic solvent, and further wherein the sum of the proportions by weight of components Aa to Ac is 100% by weight.

9. Mixer system according to claim 1, wherein the pigment-free component B of the mixer system comprises:
Ba) from 60 to 98% by weight of water,
Bb) from 0 to 10% by weight of at least one rheology-controlling additive, this amount being based on the weight of the pure additive without solvent fraction, and
Bc) from 2 to 39.9% by weight of the second binder polymer according to claim 1.

10. Mixer system according to claim 1, wherein each of said base colors A comprises the same binder component.

11. Mixer system according to claim 1, wherein each of said base colors A has the same ratio of solid binder to organic solvent.

12. A process for preparing water-dilutable coating compositions with precisely defined tinting, comprising the steps of:

preparing a plurality of base colors; separately storing each of said base colors, and mixing, shortly before application of the coating composition, at least one base color a and at least one component B of the mixer system of claim 1.

13. A method of coating an automotive vehicle or plastic automotive components, comprising the steps of:

providing a coating composition according to the method of claim 12;

diluting the composition with water; and applying the composition to a vehicle or said components.

14. A method of refinishing an automotive vehicle, comprising the steps of:

preparing an aqueous coating composition according to the method of claim 12;

diluting the composition with water; and applying the coating composition over a base coat on a substrate to repair imperfections in said base coat.

15. Mixer system according to claim 8, wherein selected base colors A comprise:
Aa) from 0.5 to 50% by weight of at least one special-effect pigment,
Ab) from 20 to 80% by weight of at least one water-dilutable binder, and
Ac) at least one organic solvent,
and further wherein the sum of the proportions by weight of components Aa to Ac is 100% by weight.

16. Mixer system according to claim 8, wherein selected base colors A comprise:
Aa) from 1 to 70% by weight of at least one inorganic coloring pigment,
Ab) from 10 to 80% by weight of at least one water-dilutable binder, and
Ac) at least one organic solvent,
and further wherein the sum of the proportions by weight of components Aa to Ac is 100% by weight.

17. Mixer system according to claim 8, wherein selected base colors A comprise:
Aa) from 1 to 30% by weight of at least one organic coloring pigment,
Ab) from 10 to 80% by weight of at least one water-dilutable binder, and
Ac) at least one organic solvent,
and further wherein the sum of the proportions by weight of components Aa to Ac is 100% by weight.

18. The mixer system of claim 9, wherein the pigment-free component B comprises:
Ba) from 70 to 95% by weight of water;
Bb) from 0.1 to 5% by weight of at least one rheology-controlling additive, this amount being based on the weight of the pure additive without solvent fraction; and
Bc) from 5 to 29.9% by weight of the second binder polymer according to claim 1.

19. The mixer system of claim 1, wherein the number of base colors A in the system is between 15 and 60.

20. The mixer system of claim 1, wherein the number of pigment-free components in the system is between 1 and 5.

21. The mixer system of claim 1 wherein each of said base colors A comprise a mixture of binder components, wherein the same binders are used in the mixture for each base color A, and in the same proportions.

* * * * *